United States Patent

Pandelisev

[11] Patent Number: 5,548,116
[45] Date of Patent: Aug. 20, 1996

[54] LONG LIFE OIL WELL LOGGING ASSEMBLY

[75] Inventor: Kiril A. Pandelisev, Mesa, Ariz.

[73] Assignee: Optoscint, Inc., Scottsdale, Ariz.

[21] Appl. No.: 203,573

[22] Filed: Mar. 1, 1994

[51] Int. Cl.⁶ ................................................ G01V 5/04
[52] U.S. Cl. ........................................ 250/256; 250/368
[58] Field of Search .................................. 250/256, 367, 250/368, 483.1, 361 R

[56] References Cited

U.S. PATENT DOCUMENTS

| | | |
|---|---|---|
| 584,750 | 6/1897 | Scribner . |
| 2,341,745 | 2/1944 | Silverman et al. . |
| 2,853,621 | 9/1958 | Ruderman . |
| 2,902,603 | 9/1959 | Ferre . |
| 2,949,534 | 8/1960 | Youmans . |
| 3,265,893 | 8/1966 | Rabson et al. . |
| 4,004,151 | 1/1977 | Novak . |
| 4,158,773 | 6/1979 | Novak . |
| 4,323,778 | 4/1982 | Wykes et al. . |
| 4,360,733 | 11/1982 | Novak et al. . |
| 4,383,175 | 5/1983 | Toepke . |
| 4,629,888 | 12/1986 | Wolk .............................. 250/256 |
| 4,833,320 | 5/1989 | Hurlbut . |
| 4,900,937 | 2/1990 | Dayton et al. . |
| 4,994,673 | 2/1991 | Perna et al. . |
| 5,047,635 | 9/1991 | Leaney et al. . |
| 5,120,963 | 6/1992 | Robinson et al. . |
| 5,229,613 | 7/1993 | Pandelisev et al. ............ 250/368 |
| 5,264,154 | 11/1993 | Akiyama et al. ............ 250/483.1 |
| 5,283,439 | 2/1994 | Bouissou et al. . |

*Primary Examiner*—David L. Willis
*Assistant Examiner*—Richard Hanig
*Attorney, Agent, or Firm*—James Creighton Wray

[57] ABSTRACT

A well logging scintillation detector has a gamma ray detector crystal with a window at one end and a single or multi-layer cladding surrounding the remainder of the crystal, with a reflective layer surrounding the cladding. The reflective layer, which may be a thin, high reflective metallic layer or reflective particles in a resin matrix, is surrounded by an elastomer with reflective particles which is surrounded by a casing which is a metal. The casing is surrounded by one or more outer casings, which are separated from each other by elastomeric members. A resilient base is formed opposite the window. The window has a flat glass plate connected to the crystal with an optical coupler, and a clear elastomer optically coupled to the plate. A larger plate is optically coupled to the elastomer, and the larger plate is sealed to one or more of the outer casings by inter-fitted corrugated rings of glass and metal which entrap epoxy, which fills the corrugations. Inner rings contain silica gel, which prevent any moisture from entering the crystal area and reducing reflectivity of its coatings.

68 Claims, 4 Drawing Sheets

LONG LIFE OIL WELL LOGGING ASSEMBLY

BACKGROUND OF THE INVENTION

Well logging scintillation detectors use nuclear sources and shields below a crystal which emits light in response to gamma radiation. The light is sensed by a photomultiplier tube which produces signals which are amplified and transmitted to electrical interpreting equipment above the surface.

Problems exist that crystals are subject to breakage, and that the system over time loses efficiency.

The well logging equipment is lowered at rapid speeds into deep wells. Pumping wells produces shocks, which may fracture the crystal or interfere with optical transmission. Cracked crystals, while they may still create light upon experiencing gamma radiation, produce less light entering the photomultiplier tube because the cracks reflect the light back into the crystal.

The well logging scintillation detectors are used at substantial well depths, and thus are subject to increased atmospheres of pressure. Speeds at which the detectors traverse the wells further add pressure differential and variance. As a result, over time, the detector's output denigrates and the detectors have to be replaced.

High well temperature also results in signal degradation. At elevated temperatures the photomultiplier produced random output pulses in the absence of incident light. The current produced by these pulses is called "dark current" and its average magnitude increases with the temperature.

The temperature effects on the scintillation events, which are caused by the incident radiation with constant energy, may result in a decrease in amplitude and an increase in duration as the temperature increases. That results in less accurate measurement of the intensity of the incident radiation, and errors in soil composition analysis.

Problems continue to exist in the cracking of crystals and in temperature-related reduced efficiency of crystals which are not cracked.

SUMMARY OF THE INVENTION

The present invention overcomes the problems of the prior art by packaging the crystal in multiple cases to reduce the potential for fracturing, and improves reflectivity of the crystal surrounding to increase crystal efficiency. The present invention also tightly seals the crystal against ingress of moisture which is responsible for reduction of reflectivity, and thus extends the life of the detector. The present invention also introduces an optical system between the crystal and the photomultiplier to increase photon collection efficiency and to allow for smaller size photomultiplier tubes to be used with large size crystals. Photomultiplier tubes of 1" are used with crystals having a 1", 2" or 3" crystal diameter In return, this will allow for better shielding of the photomultiplier tube, lower breakage, and a better signal vs. noise (S/N) ratio. A novel heat shield and heat shield-magnetic shield is also part of this invention. A logging scintillation detector having better shock protection, a multi-barrier moisture seal, and better thermal and magnetic shielding is the final result of this invention.

The well logging scintillation detector has a gamma ray detector crystal with a window at one end and a single or multi-layer cladding surrounding the remainder of the crystal, with a reflective layer surrounding the cladding. The reflective layer, which may be a thin, high reflective metallic layer or metal foil with high surface reflectivity, or reflective particles in a resin matrix, is surrounded by an elastomer with reflective particles which is surrounded by a casing which can be a metal. The casing is surrounded by one or more outer casings, which are separated from each other by elastomeric members. A resilient base is formed opposite the window. The window has a flat glass plate connected to the crystal with an optical coupler, and a clear elastomer optically coupled to the plate.

A larger plate is optically coupled to the elastomer, and the larger plate is sealed to one or more of the outer casings by inter-fitted corrugated rings of glass and metal which entrap epoxy, which fills the corrugations. Inner rings contain silica gel, which prevent any moisture from entering the crystal area and reducing reflectivity of its coatings. A glass-to-metal seal may be added in which only the area of the glass adjacent the seal is doped with a metal which is compatible with the seal alloy. An extension of the outermost casing is lined with elastomeric material in which a photomultiplier tube is embedded. The photomultiplier tube has connectors which engage complementary connectors in an electronics communication package. All of the elements are enclosed in a cylindrical housing with a nuclear shield below the crystal casings. A receiver below the shield receives a radiation source.

The oil well logging assembly of the present invention provides better shock protection of the crystal in an axial or radial direction by introducing multiple shock-absorbing protection.

The optical assembly, which consists of multiple lenses and optical windows, provides better light collection efficiency and an addition to the multi-barrier moisture seal which prevents crack propagation and moisture penetration through the cracks. In addition to the epoxy, silica gel pockets are added for trapping any possible moisture into the detector area.

Thermal shield material combined with additional thin metal heat reflectors and a metal alloy magnetic shield are being used. A novel approach of a combination of heat and a magnetic shield by means of electroplated heat reflector material on magnetic shield alloy foil layered with thermal heat shield material will allow a very compact shielded detector for oil well explorations. It is expected that the detectors will see non or very small temperature changes, mainly due to the shielding and detector construction during a standard logging of a particular well.

It is assumed that the average time to log a well is 5–6 hours.

The choice of the metal layer for the reflector mirror can also contribute to the heat shield of the detector crystal.

In conclusion, the present invention is an oil well detector having multiple shock and moisture isolation, a collimating optical system for better light collection, and a multi-layer reflector with a metal film for pulse height improvements, all thermally and magnetically shielded by a multi-layer shielding structure consisting of a thermal insulator, magnetic shielding metal layers and heat reflecting layers.

These and further and other objects and features of the invention are apparent in the disclosure, which includes the above and ongoing written specification, with the claims and the drawings.

DETAILED DESCRIPTION OF THE DRAWINGS

Figures 1, 2:
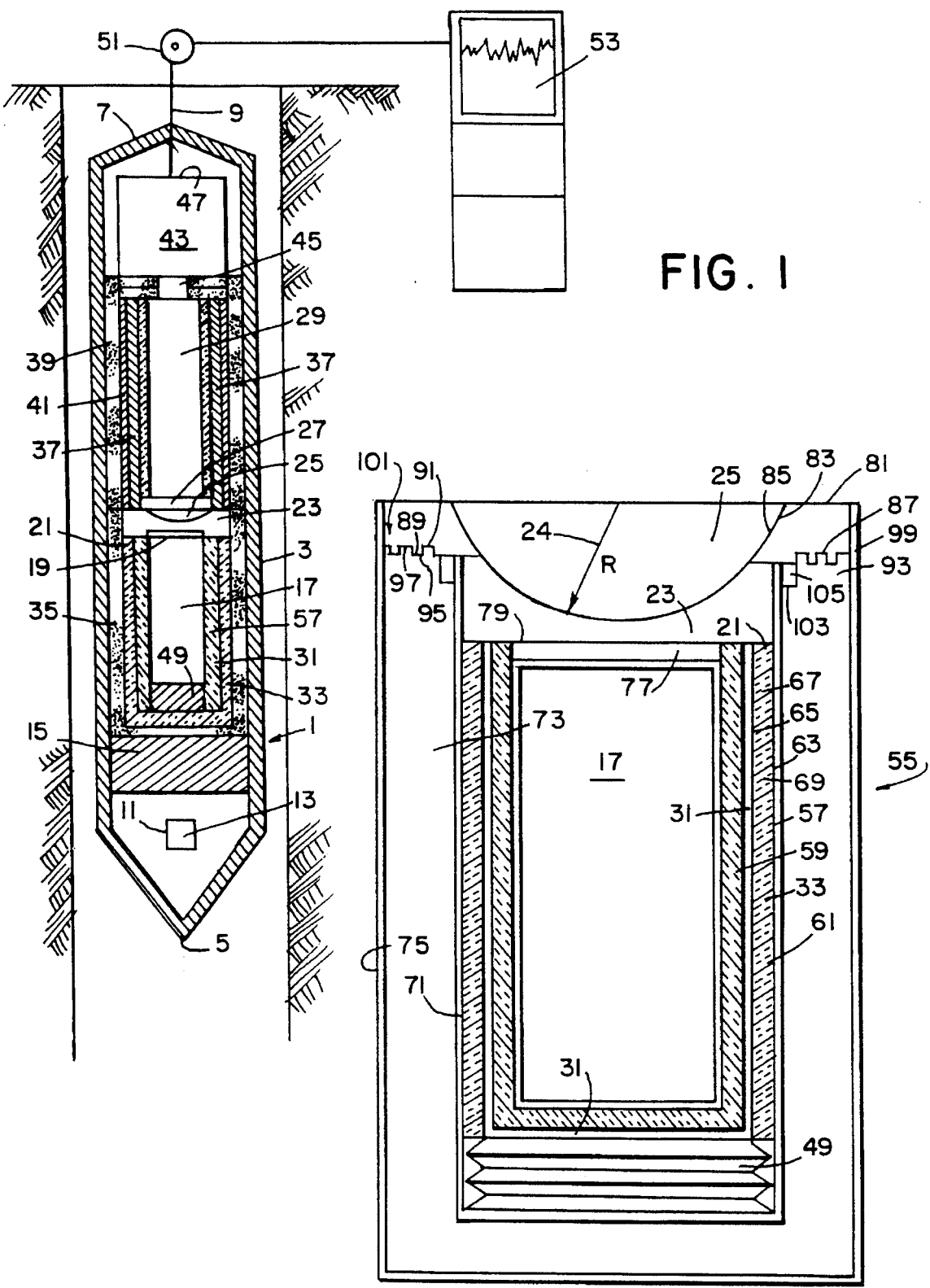
FIG. 1 is a schematic cross-sectional representation of a well logging tool of the present invention.
FIG. 2 is a detail of the crystal mounting structure.

Referring to FIG. 1, a well logging apparatus is generally indicated by the numeral 1. A cylindrical housing 3 with pointed or rounded lower and upper ends 5 and 7 encloses the logger. The logging tool 1 is suspended by a cable 9, which also includes electronic communications cables. The lower nose of the housing has a receiver 11 for a gamma or neutron nuclear source 13. A large shield 15 protects the remainder of the logging tool from receiving direct radiation from the source 13. A crystal 17 receives radiation from the surrounding wall structure. The gamma rays which penetrate the housing and casings and supporting structure enter the crystal 17, and the crystal produces light upon receiving the gamma rays. Light from the crystal is directed through a window 19, which includes an optical coupling layer 21, a silicone rubber lens 23, and a glass lens 25. An optically clear elastomer 27 conducts the light to a photomultiplier tube 29.

The crystal 17 is surrounded by plural protective casings 31, which are isolated by shock-absorbing material 33 and a thermal insulator 35. The photomultiplier tube 29 is surrounded by cushioning material 37 and a thermal and magnetic shield 39, and is also surrounded by plural layers of magnetic shielding.

An electronics communication package 43 is connected to the photomultiplier tube 29 by plug-in connections 45, and the entire package is surrounded by an outer casing 47, which is spaced within the housing 3. The space between the housing 3 and the outer casing 47 may be filled with a shock and thermal isolator.

One or more casings 33 surrounding the crystal 17 are separated at an end opposite the window 19 by a spring-like cushioning assembly 49.

The windings and pulley mechanisms are schematically illustrated as number 51, and the well logging recording apparatus is schematically represented by box 53.

The housing 3 is openable to provide access to the principle detector components. The photomultiplier and crystal assembly may be unplugged from the electronics package, and may be replaced with a new photomultiplier and crystal assembly in the field.

FIG. 2 is an enlarged representation of the crystal mounting system 55. Crystal 17 is surrounded by a cladding and reflective layer system 57, which is surrounded by a shock-absorbing layer 59. The shock-absorbing layer and the outer shock-absorbing layer 61 are preferably constructed with two flat inner and outer surfaces 65 and 63 and bridges 67 between the surfaces, which create voids 69. The voids 69 may be filled with elastomeric material having a different hysteresis characteristic than the elastomer which forms the cushions 59 and 61.

The cushion 59 surrounds the crystal 17, and a casing 31 surrounds cushion 59. One end of the inner casing 31 is supported on the spring cushion package 49. An intermediate casing 71 surrounds the spring 49 and cushion 61, and a thermal and magnetic insulation layer 73 surrounds the intermediate casing. An outer casing 75 surrounds the thermal and magnetic insulation 73. The window 19 is formed by an optical coupler layer 21, which connects one end of the crystal to a glass window 77. An optical coupler 79 connects the glass window 77 to a silicone rubber lens 23, which is in turn connected by an optical coupler by glass lens 25. The silicone lens and glass lens are configured to transmit all light from the crystal to the photomultiplier tube.

The two lenses 23 and 25 have distinct indexes of refraction and form a couplet and achromatic lens, which collimate light from the crystal and direct light to the photomultiplier tube without color fringing.

Figure 7:
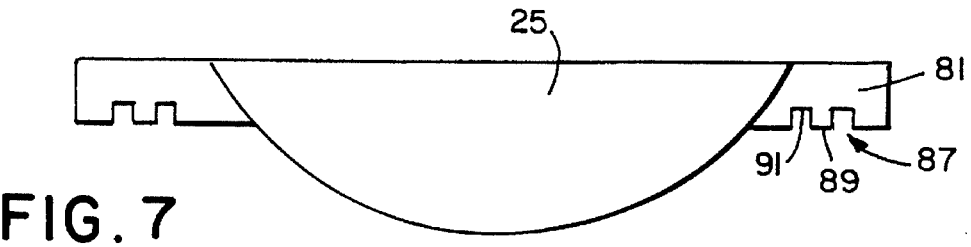
FIG. 7 is a detail of a window and lens.

As shown in FIGS. 2 and 7, the glass lens 25 is sealed to a metal lens support plate 81 with a glass-to-metal seal 83, which includes a sealing alloy. A portion 85 of the lens 25 adjacent the glass-to-metal seal is doped with a metal such as lead or indium to promote molecular joining in the glass-to-metal seal.

Figure 14:
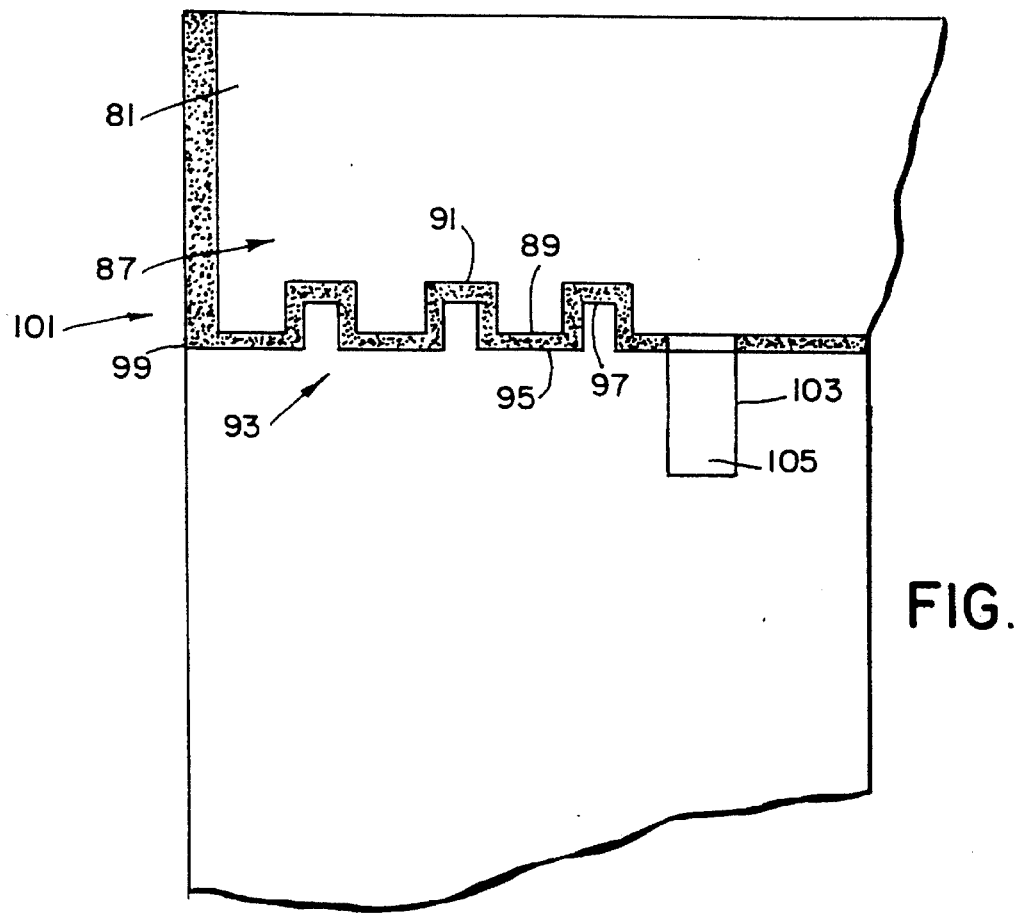
FIG. 14 shows a detail of the seal shown in FIG. 2.

As shown in FIGS. 2 and 14, rings 87 having alternating projections 89 and grooves 91 are formed in the mounting plate 81. Complementary rings 93 having grooves 95 and projections 97 are formed at the upper end of the casing. The end of the thermal and magnetic insulation structure has similar rings.

Spaces between the rings are filled with an epoxy 99, which forms a multi-barrier seal 101. The rings prevent any cracks in the epoxy from propagating directly across the seal.

A recess 103 at the inner end of the multi-barrier seal 101 is filled with a desiccant 105, which prevents any moisture from reaching the crystal and reflective layers.

Figure 3:
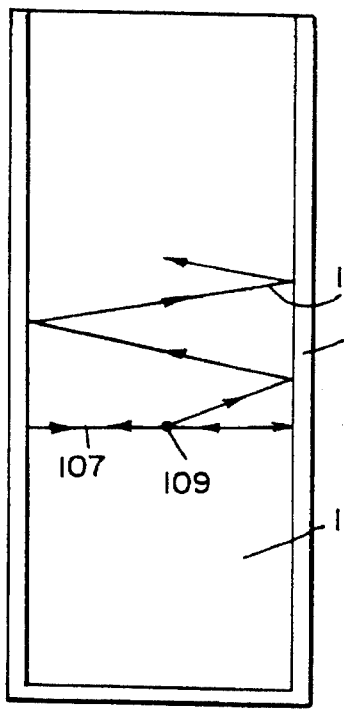
FIG. 3 is a schematic representation of the crystal having cylindrical walls.

As shown in FIG. 3, a cylindrical crystal 17 with a reflective layer system 57 generates light 107 at a scintillation event 109 in reaction to a gamma ray. The light may travel in any or all directions. Some of the light 111 reflects off the reflective layer system 57 on its way to the window 19.

Figure 4:
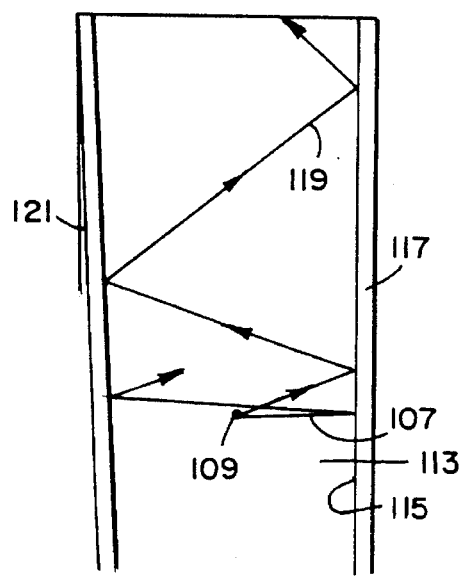
FIG. 4 is a schematic representation of a preferred crystal having a truncated conical side wall.

As shown in FIG. 4, a preferred crystal 113 has a truncated conical wall 115, which is surrounded by the reflective layer 117. At a scintillation event 109, light 107 is produced and the truncated conical walls reflect and guide light 119 more efficiently to the window 19. The dash line 121 shows the angle of inclination of the truncated conical wall.

Figure 5:
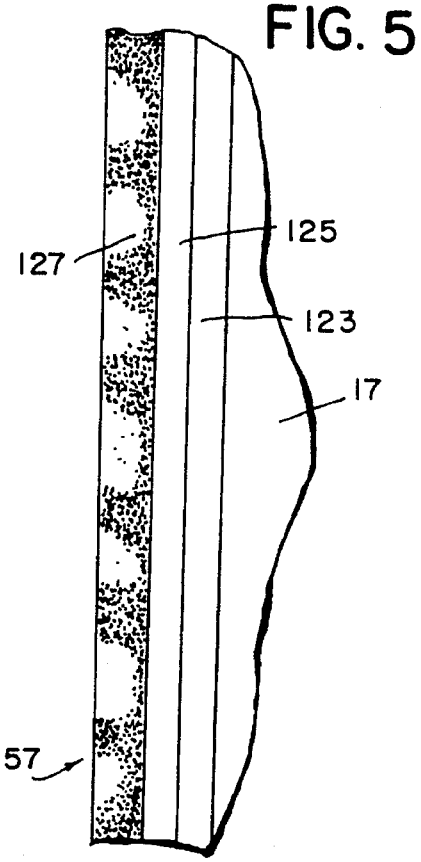
FIG. 5 is a detail of the cladding and reflector which surrounds a crystal, except at the window.

FIG. 5 shows a preferred reflective layer system 57 for a crystal 17. A first cladding 123 surrounds the crystal, and a second cladding 125 surrounds the first cladding. A metal reflector 127 surrounds the second cladding.

The first and second claddings have different indexes of refraction, and the indexes of refraction of the claddings 123 and 125 are different from the index of refraction of the crystal 17. Light from the crystal is refracted in the cladding, bending and directing the rays and improving the reflection from the metal reflector layer 127. The metal reflector may be deposited as a metal layer. Preferably the metal reflector is electrodeposited on an inner surface of a metal foil, forming a highly reflective metal layer.

Figure 6:
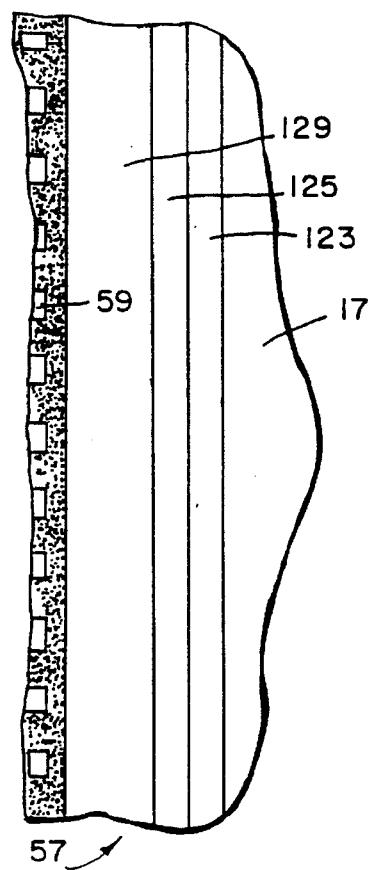
FIG. 6 is a detail of an alternative cladding, reflector and cushioning layer which surrounds a crystal.

Another reflective layer system 57 is shown in FIG. 6. A first cladding layer 123 surrounds the crystal 17, and a second cladding layer 125 surrounds the first cladding layer. A diffuse reflective surface 129 surrounds the outer cladding layer 125. The diffuse reflector surface may be made of highly reflective powders in a resin matrix. A cushioning layer 59 surrounds the diffuse reflective surface 129.

As shown in the detail of FIG. 7, and as described with reference to FIG. 2, the glass lens 25 may be sealed to a metal support plate 81. The plate 81 has grooves 91 and extensions 89, which form a part 87 of the sealing structure.

Figure 8:
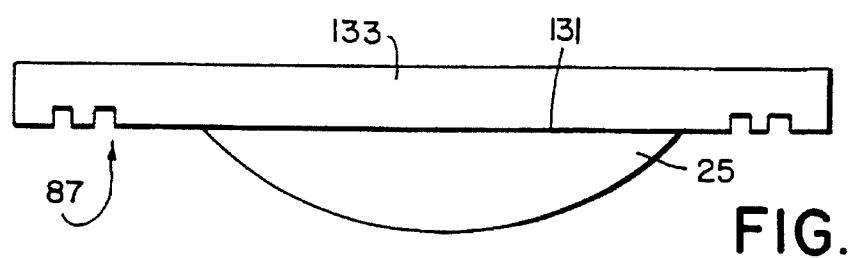
FIG. 8 is an alternate detail of a window and lens.

Alternatively, as shown in FIG. 8, the glass lens 25 may be optically coupled 131 to a flat glass support plate 133. Similar rings 87 for sealing may be formed in the glass support plate 133.

Figure 9:
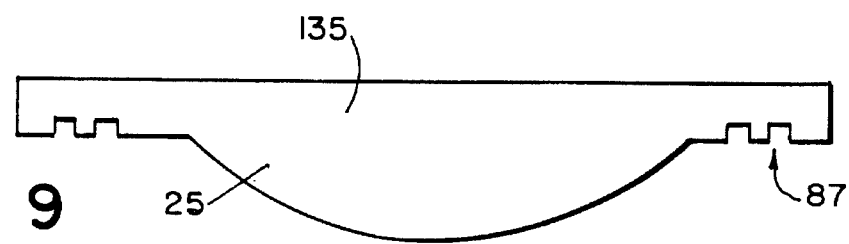
FIG. 9 is a detail of a integral window and lens.

In an alternative embodiment, the lens 25 may be integrally formed with a glass base 135, with the sealing rings 87 formed in the glass base 135 adjacent the lens 25, as shown in FIG. 9.

Figure 10:
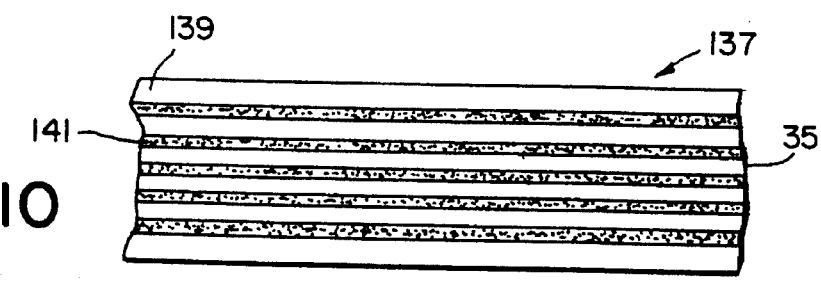
FIG. 10 is a detail of a thermal insulator which surrounds the casings.

FIG. 10 shows one thermal insulation 35 for surrounding the casings 33, as shown in FIG. 1. The multi-layer thermal insulator 137 shown in FIG. 10 includes alternating layers of thermal insulation, such as a polymeric material 139, interposed with alternating layers of heat reflectors 141, such as metal foil.

Figure 11:
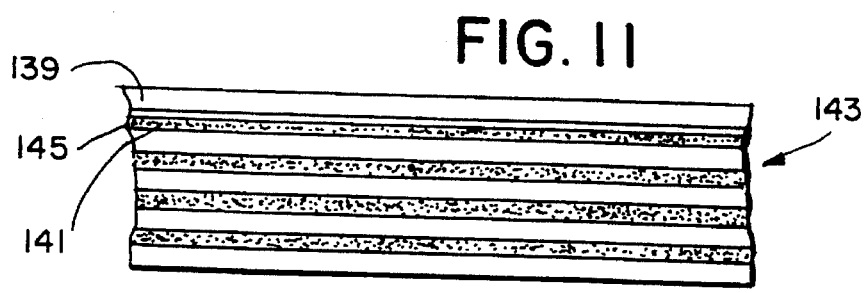
FIG. 11 is a detail of a thermal and magnetic insulator which surrounds the casings.

FIG. 11 shows a multi-layer assembly 143 of alternating layers of thermal insulation 139, heat reflectors 141 and magnetic shields 145.

Figure 12:
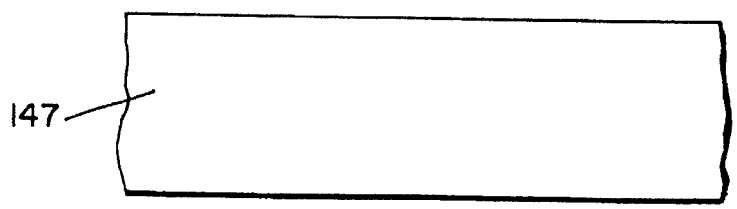
FIG. 12 is a detail of an alternate single layer insulator.

A single layer insulator 147 is shown in FIG. 12 as an alternative for use as the insulator 35 shown in FIG. 1.

Figure 13:
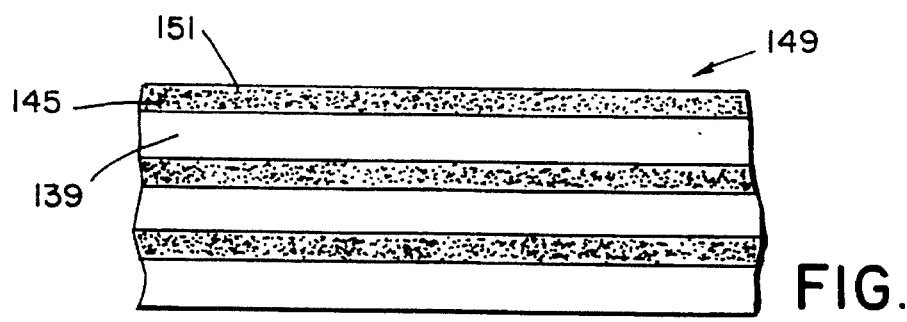
FIG. 13 is a detail of a reflector and magnetic shield which surrounds a crystal.

FIG. 13 shows a combined and magnetic shield layer 149, which includes a layer 151 of electroplated aluminum or other metal reflector, for example silver or nickel which has been plated on a magnetic shield foil 153.

While the invention has been described with reference to specific embodiments, modifications and variations of the invention may be constructed without departing from the scope of the invention, which is defined in the following claims.

I claim:

1. Well logging scintillation detector apparatus, comprising a crystal, an optical system at one end of the crystal, a cladding layer surrounding a front and a back of the crystal except at the optical system, a reflective layer surrounding the cladding layer, an inner cushion surrounding the reflective layer, an inner housing surrounding the inner cushion, an outer cushion surrounding the inner housing, an outer housing, a thermal insulator surrounding the outer cushion within the outer housing, and a seal adjacent the optical system for sealing the detector against moisture.

2. The apparatus of claim 1, further comprising an intermediate housing between the second cushion and the thermal insulator.

3. The apparatus of claim 1, further comprising a spring between the inner housing and the outer housing at ends of the housings opposite the optical system.

4. The apparatus of claim 1, further comprising a case surrounding the housings, a photomultiplier mounted in the case, and an electronics package mounted in the case.

5. The apparatus of claim 1, further comprising an outer case, a nuclear source mounted in the case, a shield mounted in the case adjacent the nuclear source, the housings mounted in the case adjacent the shield, a photomultiplier tube mounted in the case in continuation of the housings and an electronic package mounted in the case and connected to the photomultiplier tube, and an output connected to the electronic package for providing signals according to radiation received by the crystal through the case and housings.

6. The apparatus of claim 1, further comprising an extension on the outer housing, thermal and magnetic insulation within the extension, an inner housing extension, shock cushioning within the inner housing extension, and a photomultiplier tube in the shock cushioning and in contact with the optical system.

7. The apparatus of claim 6, further comprising a case surrounding the housings and the extensions, an electronics package mounted within the case and shielding mounted within the case, and a receiver in the case near the shielding for receiving a nuclear source material.

8. The apparatus of claim 7, wherein the electronics package and the photomultiplier tube are connected by a plug-in electronic connector.

9. The apparatus of claim 1, wherein the optical system further comprises a glass plate optically coupled to the crystal, a transparent elastomer connected to the optical plate, and a transparent glass cover connected to the elastomer for connecting the transparent glass cover to a photomultiplier tube.

10. The apparatus of claim 1, wherein the optical system comprises plural lenses, and wherein the optical system comprises at least one silicone rubber layer.

11. The apparatus of claim 10, wherein the optical system comprises a glass lens and a silicone rubber lens.

12. The apparatus of claim 11, wherein the optical system comprises a divergent silicone rubber lens and a convergent glass lens.

13. The apparatus of claim 12, further comprising a glass plate between the crystal and the silicone rubber divergent lens.

14. The apparatus of claim 1, wherein the optical system comprises a glass plate optically coupled to the one end of the crystal, a silicone rubber layer connected to the glass plate, and a glass layer connected to the silicone rubber layer.

15. The apparatus of claim 14, wherein the silicone rubber layer is a divergent lens and the glass layer is a convergent lens, which together form an achromatic couplet.

16. A well logging scintillation detector, comprising a crystal in a layer within a metal casing and an optical system at one end of the crystal, and a moisture barrier and non-porous coupling seal between the optical system and the casing, comprising multiple spaced annular rings in the casing, multiple spaced annular rings in the optical system interfitting with the rings in the casing, and epoxy deposited in spaces between the multiple annular rings.

17. The apparatus of claim 16, further comprising moisture absorbent material deposited within a depression in the casing ring.

18. A well logging scintillation detector, comprising a crystal in a reflective layer within a metal casing and an optical system at one end of the crystal, and a glass-to-metal seal between the optical system and the metal casing, the glass-to-metal seal comprising an alloy between the metal and the glass, a metal dopant in the glass in contact with the alloy.

19. The apparatus of claim 18, further comprising a zinc electroplate on the metal adjacent the alloy.

20. The apparatus of claim 18, wherein the alloy is an indium zinc alloy having a melting point of about 300° C. or more, and wherein the dopant is selected from the group consisting of lead, tin and indium, and wherein the electroplate is a zinc electroplate.

21. The apparatus of claim 18, wherein the optical system comprises plural lenses, and wherein the optical system comprises at least one silicone rubber layer.

22. The apparatus of claim 18, wherein the optical system comprises a glass lens and a silicone rubber lens.

23. The apparatus of claim 18, wherein the optical system comprises a divergent silicone rubber lens and a convergent glass lens.

24. The apparatus of claim 23, further comprising a glass plate between the crystal and the silicone rubber divergent lens.

25. The apparatus of claim 18, wherein the optical system comprises a glass plate optically coupled to the one end of the crystal, a silicone rubber layer connected to the glass plate, and a glass layer connected to the silicone rubber layer.

26. The apparatus of claim 18, wherein the silicone rubber layer is a divergent lens and the glass layer is a convergent lens, which together form an achromatic couplet.

27. A well logging scintillation detector, comprising a crystal in a reflective layer within a metal casing and an optical system at one end of the crystal, and a seal between the optical system and the metal casing, wherein the optical system comprises two or more lenses.

28. The apparatus of claim 1, wherein the optical system comprises an achromatic couplet.

29. The apparatus of claim 28, further comprising a glass plate optically coupled to one end of the crystal, a transparent silicone rubber layer on the glass plate, and a glass layer on the silicone rubber layer.

30. The apparatus of claim 29, wherein the silicone rubber layer is a divergent lens and the glass layer is a convergent lens.

31. A well logging scintillation detector, comprising a crystal in a reflective layer within a metal casing and an optical system at one end of the crystal, and a seal between the optical system and the metal casing, further comprising a cladding layer on the crystal having a clear construction and a low index of refraction close to an index of refraction of glass, and a reflective layer surrounding the cladding layer.

32. The apparatus of claim 31, wherein the reflective layer is a metal layer.

33. The apparatus of claim 32, wherein the metal layer is gold, silver or aluminum sputtered or evaporated on the cladding layer.

34. The apparatus of claim 31, wherein the reflective layer is a customized layer of silicone rubber with 5% to 25% of highly reflective finely divided powder of MgO, $TiO_2$ or $BaSO_4$.

35. The apparatus of claim 32, wherein the metal layer of Au, Ag or Al is deposited by sputtering or evaporation on a metal foil and then is coupled to the second cladding layer.

36. The apparatus of claim 31, further comprising a heat shield/magnetic shield metal combination formed by electroplating Al on a magnetic shield foil.

37. The apparatus of claim 31, wherein the optical system comprises a glass lens supported by a plate.

38. The apparatus of claim 31, wherein the crystal has a truncated conical side wall for reflecting light toward the optical system.

39. The apparatus of claim 31, wherein the crystal has a cross-section which is other than circular.

40. Fully encapsulated scintillation detector apparatus, comprising a scintillation crystal, an optical lens system at one end of the crystal, a reflective layer surrounding a front and a back of the crystal except at the optical system, an inner housing surrounding the reflective layer, and a seal around the optical system for sealing the detector against moisture.

41. The apparatus of claim 40, wherein the optical lens system comprises an optical coupler and a glass lens.

42. The apparatus of claim 40, further comprising a cushion surrounding the inner housing and an outer housing surrounding the cushion between the inner housing and the outer housing except at the optical system.

43. The apparatus of claim 40, further comprising a case surrounding the housings, a photomultiplier mounted in the case in optical communication with the optical system, and an electronics package mounted in the case and electrically connected to the photomultiplier.

44. The apparatus of claim 40, further comprising an extension on the outer housing, thermal and magnetic insulation within the extension, an inner housing extension.

45. The apparatus of claim 40, wherein the optical system further comprises a glass plate optically coupled to the crystal, a transparent elastomer connected to the optical plate, and a transparent glass cover connected to the elastomer for connecting the transparent glass cover to a photomultiplier tube.

46. The apparatus of claim 40, wherein the optical lens system comprises a at least one lens.

47. The apparatus of claim 46, wherein the optical system comprises a divergent lens and a convergent lens.

48. The apparatus of claim 46, further comprising a glass plate between the crystal and the lens.

49. The apparatus of claim 47, wherein the divergent lens and the convergent lens together form an achromatic couplet.

50. Scintillation detector apparatus, comprising a scintillation crystal within a metal casing and an optical system at one end of the crystal, and a moisture barrier and non-porous coupling seal between the optical system and the casing, comprising multiple spaced annular rings in the casing, multiple spaced annular rings in the optical system interfitting with the rings in the casing, and epoxy deposited in spaces between the multiple annular rings.

51. The apparatus of claim 50, further comprising moisture absorbent material deposited within a depression in a casing ring.

52. A scintillation detector, comprising a scintillation crystal in a reflective layer within a metal casing and an optical system at one end of the crystal, and a glass-to-metal seal between the optical system and the metal casing, the glass-to-metal seal comprising an alloy between the metal and the glass, a metal dopant in the glass in contact with the alloy.

53. The apparatus of claim 52, further comprising a zinc electroplate on the metal adjacent the alloy.

54. The apparatus of claim 52, wherein the alloy is an indium zinc alloy having a melting point of about 300° C. or more, and wherein the dopant is selected from the group consisting of lead, tin and indium, and wherein the electroplate is a zinc electroplate.

55. The apparatus of claim 52, wherein the optical system comprises a divergent lens and a convergent lens.

56. The apparatus of claim 55, further comprising a glass plate between the crystal and the divergent lens.

57. The apparatus of claim 52, wherein the optical system comprises a glass plate optically coupled to the one end of the crystal, a silicone rubber layer connected to the glass plate, and a glass layer connected to the silicone rubber layer.

58. A scintillation detector, comprising a scintillation crystal within a casing and an optical system at one end of the crystal, and a non-porous seal between the optical system and the metal casing, wherein the optical system comprises one or more lenses.

59. The apparatus of claim 58, wherein the optical system comprises a couplet.

60. The apparatus of claim 59, wherein the optical system further comprises a glass plate optically coupled to one end of the crystal, a transparent silicone rubber layer on the glass plate, and a photo sensor on the silicone rubber layer.

61. A scintillation detector, comprising a scintillation crystal within a casing and an optical system at one end of the crystal, and a seal between the optical system and the casing, wherein the crystal has a truncated side wall for reflecting light toward the optical system.

62. The apparatus of claim 61, wherein the crystal has a cross-section which is other than circular.

63. The apparatus of claim 61, further comprising a cladding layer on the crystal having a clear construction and a low index of refraction close to an index of refraction of glass, and a reflective layer surrounding the cladding layer.

64. The apparatus of claim 63, wherein the reflective layer is gold, silver or aluminum sputtered or evaporated on the cladding layer.

65. The apparatus of claim 63, wherein the reflective layer is a customized layer of silicone rubber with 5% to 25% of highly reflective finely divided powder of MgO, $TiO_2$ or $BaSO_4$.

66. The apparatus of claim 63, wherein the reflective layer of Au, Ag or Al is deposited by sputtering or evaporation on a metal foil and then is coupled to the cladding layer.

67. The apparatus of claim 61, further comprising a heat shield/magnetic shield metal combination formed by electroplating Al on a magnetic shield foil.

68. The apparatus of claim 61, wherein the optical system comprises a glass lens supported by a glass plate.

\* \* \* \* \*